July 30, 1957   R. L. CLAY   2,801,137
SILO UNLOADER

Filed Aug. 24, 1954   4 Sheets-Sheet 1

INVENTOR
ROGER L. CLAY
BY Bair, Freeman & Molinare
ATTORNEYS

July 30, 1957 R. L. CLAY 2,801,137
SILO UNLOADER
Filed Aug. 24, 1954 4 Sheets-Sheet 2

INVENTOR
ROGER L. CLAY
BY Bair, Freeman & Molinare
ATTORNEYS

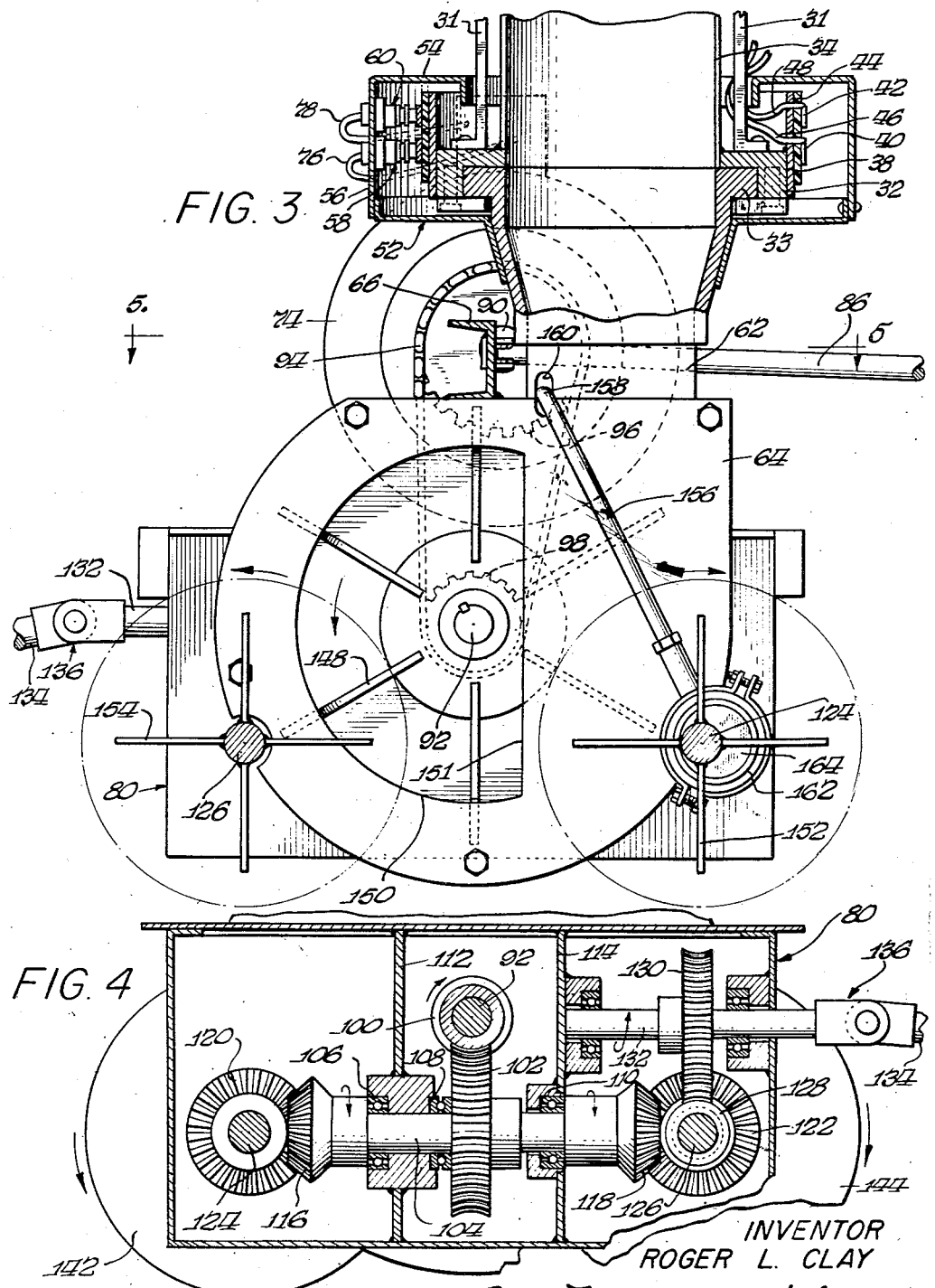

July 30, 1957 — R. L. CLAY — 2,801,137
SILO UNLOADER
Filed Aug. 24, 1954 — 4 Sheets-Sheet 4

INVENTOR
ROGER L. CLAY
BY Bair, Freeman & Molinare
ATTORNEYS

United States Patent Office 2,801,137
Patented July 30, 1957

2,801,137

SILO UNLOADER

Roger L. Clay, Cedar Falls, Iowa, assignor to Clay Equipment Corp., Cedar Falls, Iowa, a corporation of Iowa Application August 24, 1954, Serial No. 451,905

3 Claims. (Cl. 302—56)

This invention relates to a mechanism for unloading silage from a silo, and more particularly to a self-propelled mechanism for automatically cutting silage from the top of a bulk of silage into a silo, gathering the cut silage, and conveying the silage for discharge laterally from the silo.

The removal of silage from a vertical silo has been one of the most dangerous and time-consuming jobs around a farm. Recently, efforts have been made to produce automatic silo unloaders which will cut the silage from the top of a mass of silage in the silo, then gather the cut silage, and then convey the silage for discharge laterally from the silo. The latter step of conveying the cut silage for discharge laterally of the silo has been a difficult problem to solve. Some attempts have been made to use mechanical conveyors for accomplishing such jobs but mechanical conveyors are rather expensive and require cumbersome supporting structures, and they have a marked tendency to develop mechanical problems due to their being subjected to the rigors of the weather elements, such as moisture, and alternate spells of heat and cold.

The United States patent to Leach et al., No. 2,580,306 describes a silo unloader which includes means for sucking cut silage upwardly to make the cut silage air-borne, and thereafter uses blown air for conveying the silage for discharge laterally of the silo. However, the Leach et al. patent is deficient in that it utilizes a suction tube for picking up the cut silage in initiating the step of making the cut silage air-borne. Suction means for starting cut silage on an air-borne journey is very inefficient and requires means for creating a large suction. Furthermore, while suction may be used somewhat satisfactorily with silage of the pellet or particle type, it is almost totally inadequate for use with grass silage which is stringy and has a tendency to mat and become intertwined with other segments of grass silage. Furthermore, when suction means are used for initiating air-borne travel of grass silage it has been found that the suction means invariably becomes clogged with clods of grass silage causing the machine to become inoperative.

Thus, one object of this invention is to provide a silo unloader for automatically cutting silage from the top of a mass of silage in a silo, for gathering the cut silage, and utilizing blower means for conveying the cut silage for discharge laterally of the silo, and including the improvement wherein the cut silage is forced mechanically into the blower's impeller thereby obviating the difficulties attendant with the use of suction means for moving the cut silage.

Another object of this invention is to provide an automatic silo unloader which may be used for unloading grass silage from storage silos.

A further object of this invention is to provide a silo unloader which utilizes a blower impeller for assisting in initiating conveyance of the cut silage from the silo and which provides means immediately upstream and downstream of the blower impeller for preventing clogging of the impeller by the cut silage.

Heretofore, silo unloaders have had rather complicated supporting frames and have included a plurality of supporting and centering wheels, or rollers, for maintaining the silo unloader centered in the silo.

A further object of this invention is to provide a novel support for a silo unloader which serves both as a support and as part of the means for conveying the cut silage for discharge from the silo.

And another object of this invention is to provide a silo unloader that utilizes a single drive member for rotating the silo unloader in the silo and which utilizes a minimum of centering rollers for maintaining the silo unloader centered in the silo.

And still a further object of this invention is to provide a silo unloader which is characterized by its simplicity of structure, efficiency of operation, and inexpensiveness of construction.

As one of the features of this invention, there is provided a pair of spaced oppositely rotating augers which serve the dual purpose of cutting the silage from the top of the mass of silage in the silo and which collect the cut silage and move it inwardly toward the center of the silo where it is then forced laterally axially into the rotating impeller of a centrifugal blower which is connected to duct means for conveying the silage to a point from whence the silage is discharged laterally of the silo. The augers and centrifugal blower are rotatably supported from an annular support which also serves as a portion of the duct means for conveying the silage from the centrifugal blower.

As another feature of this invention, the portion of the silo unloader which sweeps across the top of the silage within the silo about the center of the silo is provided with only two guide roller contacts for engaging the walls of the silo and a silage engaging drive means which not only drives the silo unloader but also forces the guide rollers into engagement with the wall of the silo, thereby providing simplified means for maintaining the silo unloader centered in the silo.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 3 is a cross-section view taken on line 3—3 of Figure 1.

Figure 4 is a cross-section view taken on line 4—4 of Figure 1.

Figure 1:
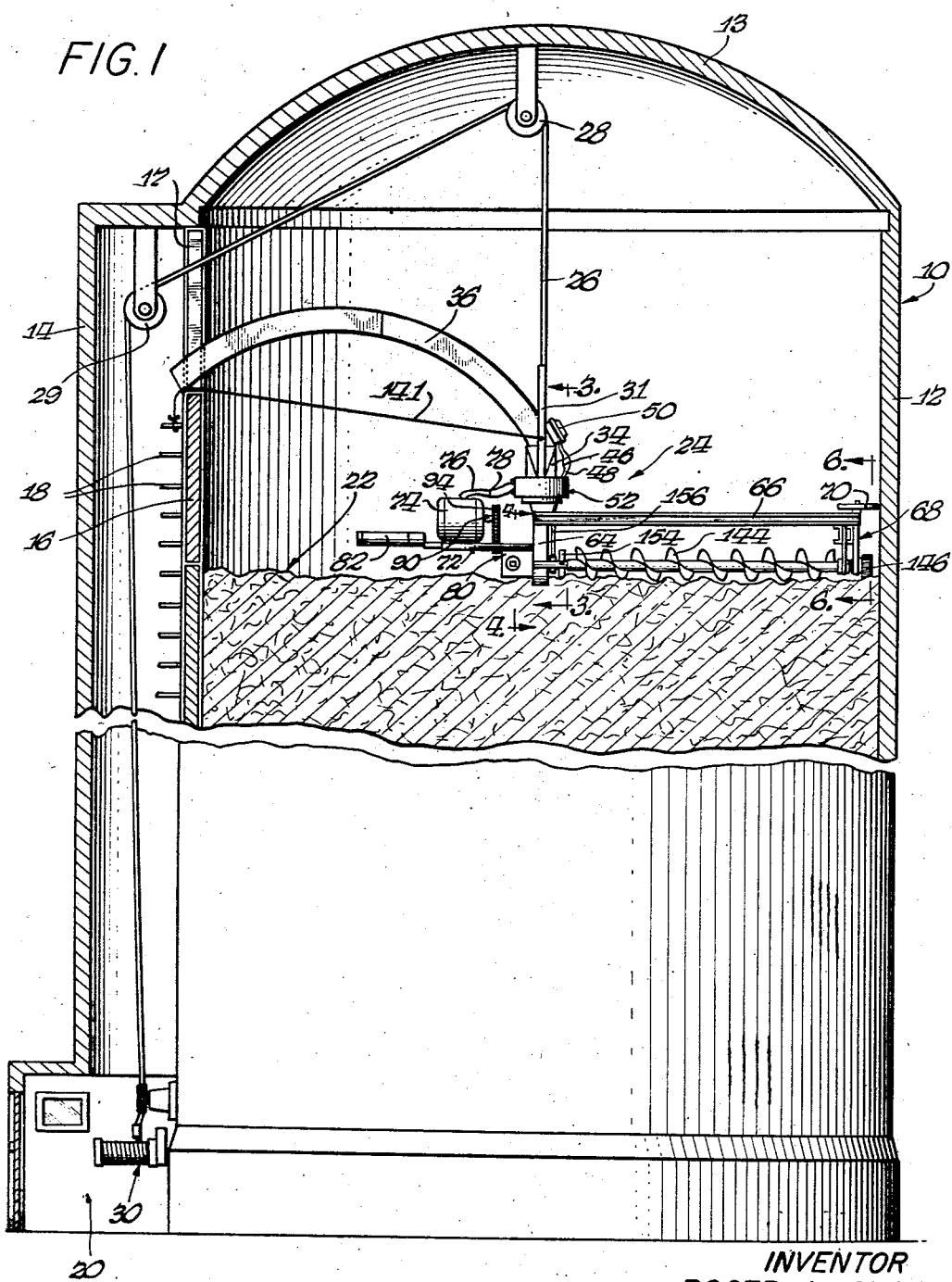
Figure 1 is a side elevation view of a silo having the silo unloader of this invention positioned therein and is taken substantially on line 1—1 of Figure 2.
Figure 2:
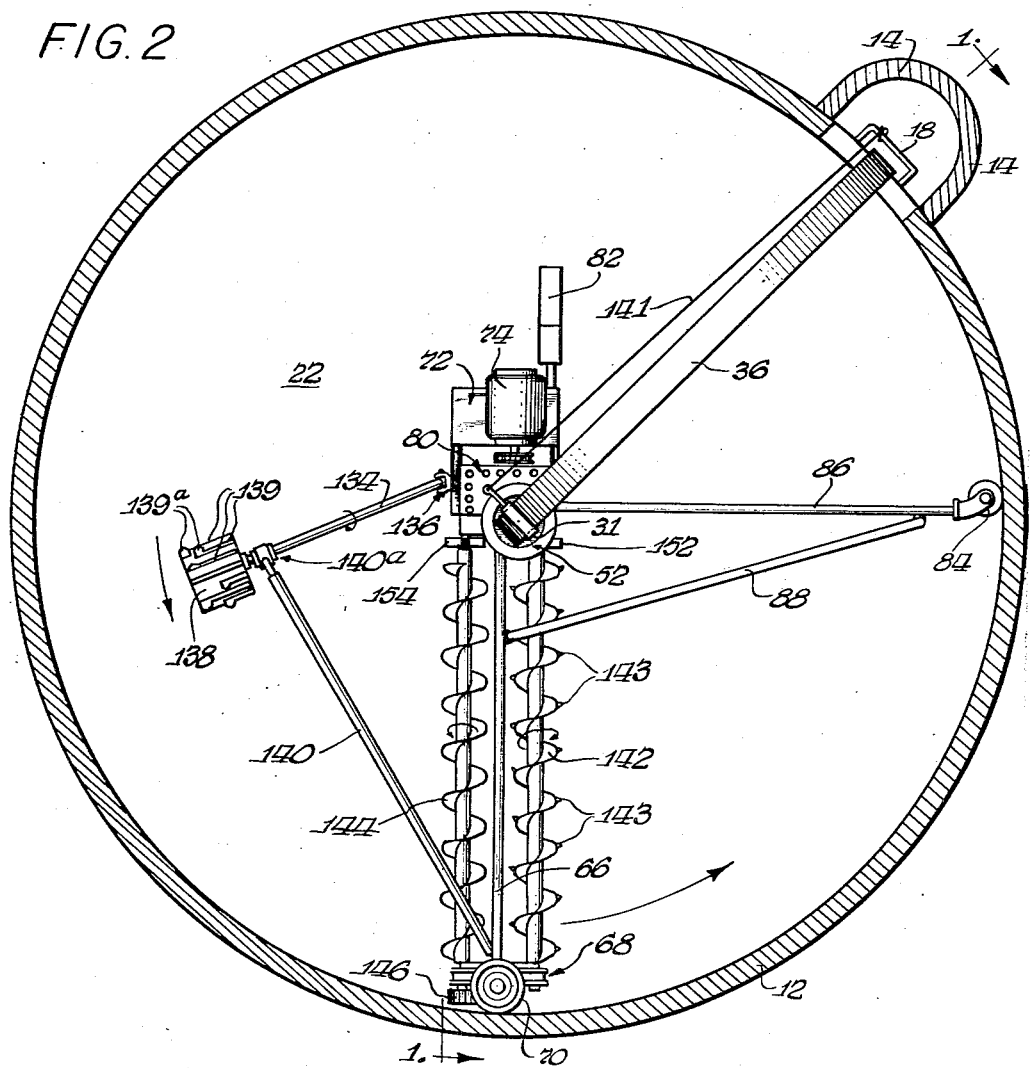
Figure 2 is a plan view of the silo shown in Figure 1.
Figure 5:
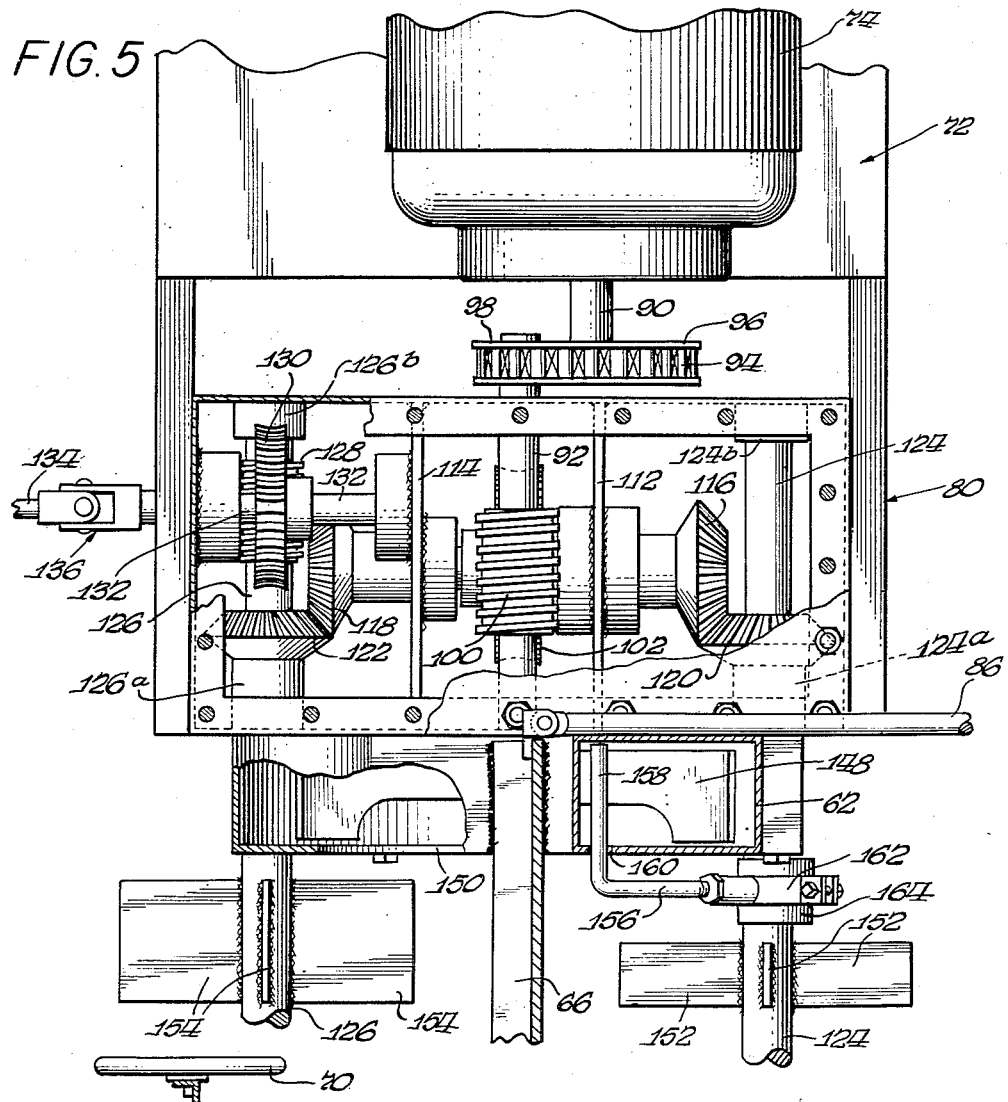
Figure 5 is a view taken substantially on line 5—5 of Figure 3 and showing a portion of the cover of the transmission casing broken away.
Figure 6:
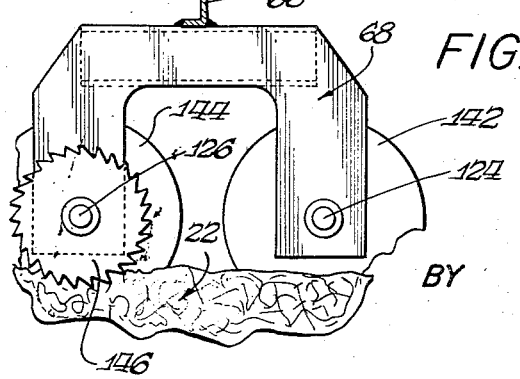
Figure 6 is a view taken on line 6—6 of Figure 1.

Referring now to the drawings, there is shown a silo 10 having an upright cylindrical wall 12, a roof 13, and a radially projecting vertical chute 14. The portion of the wall 12 opposite chute 14 is provided with a plurality of removable wall panels 16 which provided access into and out of the silo at various heights through access openings 17. The wall 12 is provided with a plurality of vertically spaced steps 18 within chute 14, which affords means for the farmer to climb up the chute for entrance into the silo. The lower end of the chute 14 opens into a chamber, or room, generally indicated at 20. The mass of silage in the silo is generally indicated at 22.

The silo unloader is generally indicated at 24 and is shown positioned in silo 10 above the mass of silage 22. Means are provided for supporting the silo unloader 24 in the silo 10 and for raising and lowering it within the silo. The latter means comprises a cable 26 secured at one end to the silo unloader 24 and being trained over a pulley 28, located centrally in said silo 10 and supported thereby, and said cable then passes laterally into chute 14 through upper access opening 17, then over a pulley 29 and down through chute 14 to a winch means 30 positioned within room 22. The winch means 30 is adapted to raise or lower the silo unloader 24 and is adapted for manual operation or motor operation, as desired.

The end of the cable 26 which is connected to the silo unloader fastens onto a support member 31 of inverted U-shape which has secured to the terminal ends of the legs of the U a recess annular support ring 32. Rotatably mounted in the support ring 32 and supported thereby is a flanged collar 33 with the flange thereof positioned in the recess of the support ring 32, as shown. The flanged collar 33 extends downwardly from support ring 32. Extending upwardly from support ring 32 and positioned between the legs of support member 31 is a transition duct 34. An arched duct 36 provided between the upper end of the transition duct 34 and aperture 17 in the silo wall provides duct means for conveying cut silage from within the silo outwardly of the silo through chute 14.

Mounted on support ring 32 is an annular flange 38 which carries thereon a pair of electrical slip rings 40 and 42 which are appropriately insulated as shown at 44. The slip rings 40 and 42 are connected by leads 46 and 48 to a junction box 50 mounted on duct 36. Conventional means (not shown) are provided for bringing electric power into junction box 50.

The rotatable collar 33 carries thereon an annular housing 52, of which the upper portion 54 thereof overlies the slip ring and serves as a weather shield. The side wall 56 of housing 52 carries a pair of electrical brushes 58 and 60 that are adapted to contact and ride along the respective slip rings 40 and 42.

Referring now to the portion of the silo unloader supported on support ring 32 by means of collar 33, said collar 33 carries therebelow an outlet duct 62 of a blower housing 64. The outlet duct 62 is secured to the collar 33 in any appropriate manner and registers axially with collar 33 to provide for passage of the silage from the blower through outlet duct 62, through collar 33, through transition duct 34, and through arched duct 36.

Mounted on blower housing 64 and extended to one side thereof is a beam 66 of channel-shaped cross section. Depending from the extended end of beam 66 is a support member 68, the function of which will become apparent as this description proceeds. The extended end of beam 66 also carries a guide wheel 70 journalled to rotate about a vertical axis and adapted to engage the inner wall of the silo 10 for rolling therealong.

Mounted on housing 64 and extending to the side opposite the beam 66 is a support member 72. Mounted in said support member 72 is an electric motor 74 which is energized through leads 76 and 78 which connect respectively to brushes 58 and 60. Also carried by support member 72 is a housing 80 for the transmission elements which distribute the torque from motor 74 to the various powered sections of the silo unloader. The support member 72 further carries a counterweight 82 for balancing the silo unloader mechanism.

There is provided a second guide wheel, or roller, 84, mounted for rotation about a vertical axis and engaging the inner wall of the silo for rolling therealong. Guide roller 84 is carried by an arm 86 disposed substantially at an angle of 90° from the beam 66 and wheel 70. A brace 88 for arm 86 is provided between arm 86 and beam 66.

Referring to the distribution of motive power from motor 74, said motor operates through shaft 90 to rotate a drive shaft 92 of the transmission housed in casing 80. A driving connection between shafts 90 and 92 is effected by means of a chain 94 trained over sprockets 96 and 98 mounted respectively on shafts 90 and 92. The drive shaft 92 has a worm 100 thereon which drives a pinion gear 102 carried by a shaft 104. Shaft 104 is appropriately journalled by means of bearings 106, 108 and 110 carried by inner walls 112 and 114 of the housing 80.

The shaft 104 carries bevel gears 116 and 118 at opposite ends thereof which respectively drive bevels 120 and 122 that are carried on a pair of shafts 124 and 126. The shafts 124 and 126 are appropriately journalled in a conventional manner, by means of bearings 124a and b and 126a and b, on housing 80. Shaft 126 carries a worm gear 128 which drives a pinion gear 130 carried by a shaft 132. The shaft 132 drives another shaft 134 through a universal joint 136 and the shaft 134 in turn rotates a drive roller 138.

The drive roller 138 is a massive roller having silage gripping axial ribs 139 and flanges 139a thereon for engaging the upper surface of the silage to obtain traction therewith for rotating the silo unloader mechanism within the silo. Shaft 136 extends obliquely, at an angle of less than 90° to beam 66, for a reason that will become apparent. Shaft 136 is braced by arm 140 carried by beam 66. Arm 140 carries a journal connection 140a for shaft 136.

A cable 141 connected to support member 31, and thereby to support ring 32, passes through upper access opening 17 and is appropriately secured to some fixed support such as step 18. Cable 141 serves to restrain the tendency of support ring 32 to turn with the silo unloader mechanism supported therefrom.

The shafts 124 and 126 are elongated and are journalled at their extended ends in support member 68. Augers 142 and 144 are mounted on shafts 124 and 126. The auger 142 is provided with teeth 143 thereon for assisting in chopping up and loosening the silage which is to be conveyed outwardly from the silo. In the preferred form shown, the augers are integral with the shafts and the shafts 124 and 126 actually appear as axial stub shafts on the augers. Shaft 126 extends outwardly of the support member 68 and has a chopper 146 mounted thereon for rotation therewith. The augers 142 and 144 terminate substantially at the center of the silo and terminate short of the blower housing 64 which is positioned on the side of the center of the silo opposite to said augers.

The shaft 92 extends through the housing 80 and into the blower housing 64 and carries thereon, for rotation therewith, a centrifugal impeller 148. The blower housing 64 is apertured at 150 adjacent the inner terminal ends of augers 142 and 144 for receiving into the blower housing the cut silage gathered by augers 142 and 144. The axis of the impeller 148 is parallel to the axes of augers 142 and 144 and is positioned substantially midway between the axes of said augers. The aperture 150 is positioned axially of the ends of the augers so that silage is, in part, forced mechanically into aperture 150 by the augers rather than relying solely upon suction produced by the rotating impeller 148. Although the impeller 148 creates some suction which tends to draw silage into said impeller, primarily the silage is forced mechanically into the impeller by the augers.

The impeller 148 rotates at high speeds and serves to pick up the silage that is forced into the blower housing and bodily throw the silage up into the blower duct 62 to initiate movement of the cut silage, whereupon the blast of air produced by the blower impeller 148 carries the silage, thus initially moved, through the ducts 62, 33, 34 and 36, which are in endwise alignment with each other, outwardly of the silo.

The aperture 150 is shaped to define a circular hole to one side, the intake side of the axis of impeller 148, to the side adjacent the auger 144. The aperture 150 terminates at a vertical chord 151 of said circular hole located to the other side, or discharge side, of said axis of the impeller 148, to the side adjacent the auger 142. In other words, the lateral extent of aperture 150 relative to the axis of impeller 148 is greater in the direction toward the intake side, or away from the axis of blower outlet 62 than in the direction toward the outlet side, or toward the axis of blower outlet 62. This latter feature reduces silage losses from adjacent the discharge side of the impeller 148 which might occur as the silage is being moved by the impeller 148 into the discharge duct 162.

The inner ends of shafts 124 and 126, between the inner ends of augers 142 and 144 and blower housing 64, have agitators 152 and 154 mounted thereon and rotatable therewith. These agitators 152 and 154 are each in the form of a plurality of paddles, or fingers, extending radially from the shaft upon which the agitators are mounted. These agitators 152 and 154 serve the dual purpose of maintaining the entrance of aperture 150 into the blower housing 64 unblocked, and in assisting in forcing the cut silage, gathered by augers 142 and 144, into the blower housing 64 through the entrance aperture 150. These agitators may be rotated by a power take-off from the source of power, motor 74, but in the preferred form, these agitators are operatively associated with the shafts 124 and 126 and are rotatable therewith.

In addition to maintaining the entrance to blower housing 64 unblocked, it is also important to maintain the outlet duct 62, from the blower housing 64, unblocked of the silage which passes therethrough. Toward the latter end, there is provided an agitator 156 having an arm 158 positioned to extend within outlet duct 62 through a vertically, elongated aperture 160 therein. The agitator 156 is operatively connected with the stub shaft 124 of auger 142 through means of a ring 162 rotatably mounted on an eccentric bearing 164 which is carried by the shaft 124 and is rotatable therewith. The arrangement of the rotatable ring 162 on eccentric bearing 164 causes the agitator arm 158 to be reciprocated in outlet duct 62 through the length of elongated aperture 160.

The arrangement of the drive roller 138 and guide rollers 84 and 70 is such that the components of the thrust of drive roller 138 are transmitted to the walls of silo 10 entirely through rollers 84 and 70. The arrangement of rollers 84 and 70 at right angles to each other and the positioning of drive roller 138 at somewhat less than 90° to roller 70 provides that the greater component of thrust of drive roller 138 is taken by roller 70 and the smaller component of thrust of drive roller 138, in cooperation with roller 84 goes into developing torque for rotating the entire apparatus around the support ring 32 upon which the silo unloading apparatus is rotatably mounted. Thus, the drive roller 138 serves both to maintain the silo unloader in engagement with the inner wall of the silo and to thus maintain the silo unloader centered within the silo, and the drive roller 138 also serves to cause rotation of the silo unloader about its pivotal mounting.

Furthermore, the counterweight 82 is so arranged relative to the axis of rotation of the silo unloader apparatus as to counterbalance the unbalanced moment of the remainder of the silo unloader apparatus. As shown, the counterweight 82 is positioned substantially diametrically of the silage cutting and gathering means which includes the augers 142 and 144; and counterweight 82 is positioned with roller 84 and its support arm 86 on one side of said diameter of the silo so as to counterbalance the drive roller 138.

The chopper 146 on shaft 126 previously referred to, serves the purpose of cutting up the outermost ridge of silage adjacent the wall of silo 10, thereby providing means for cutting down the entire surface of the silage within the silo without leaving ridges where the augers fail to engage the silage.

In a typical design of a silo unloader constructed in accordance with this disclosure, gear ratios and motor sizes are so selected and designed that using a 3 HP. motor with a shaft speed of about 1750 R. P. M., the augers 142 and 144 are caused to rotate at about 120 R. P. M., the shaft 134 and the drive roller 138 are caused to rotate at about 3 R. P. M., and the blower 148 rotates at about 2500 R. P. M. With the drive roller 138 rotating at about 3 R. P. M., the silo unloader mechanism is caused to rotate within the silo at a rate of one revolution in about 3 minutes.

While there has been shown and described a particular embodiment of this invention, it will be obvious to those skilled in the art that various changes and modifications may be made therein without departing from the invention and, therefor, it is intended in the appended claims to cover all such changes and modifications as fall within the true spirit and scope of the invention.

What I claim as new, and desire to secure by Letters Patent of the United States, is:

1. In a silo unloader of the type adapted for installation in a silo above the surface of the silage and which includes means for cutting silage from the top of the silage stored in the silo, means for gathering and moving the cut silage toward the center of the silo, and means for discharging the cut silage laterally from the silo; the improvement comprising, in combination, a pair of parallel, oppositely rotating elongated augers adapted to engage the upper surface of the silage in said silo and to cut and loosen silage therefrom and to gather said cut and loosened silage between said parallel augers and move said silage axially of said augers toward the center of the silo, a centrifugal blower spaced axially of said augers and positioned so that the axis of the impeller is parallel to the axes of the augers and spaced substantially midway therebetween, a housing for said blower defining a lateral opening for receiving silage therethrough from said augers, duct means adapted to receive silage from said blower for conveying and discharging the cut silage laterally from the silo, and movable agitating means extending into said duct means and being operative for preventing blockage of said duct means by the silage passing therethrough.

2. In a silo unloader of the type adapted for installation in a silo above the surface of the silage and which includes means for cutting silage from the top of the silage stored in the silo, means for gathering and moving the cut silage toward the center of the silo, and means for discharging the cut silage laterally from the silo; the improvement comprising, in combination, a pair of parallel, oppositely rotating elongated augers adapted to engage the upper surface of the silage in said silo and to cut and loosen silage therefrom and to gather said cut and loosened silage between said parallel augers and move said silage axially of said augers toward the center of the silo, a centrifugal blower spaced axially of said augers and positioned so that the axis of the impeller is parallel to the axes of the augers and spaced substantially midway therebetween, a housing for said blower defining a lateral opening for receiving silage therethrough from said augers, duct means adapted to receive silage from said blower for conveying and discharging the cut silage laterally from the silo, and movable agitating means operatively connected to said rotating augers and positioned to extend into said duct means and being operative for preventing blockage of said duct means by the silage passing therethrough.

3. In a silo unloader of the type adapted for installation in a silo above the surface of the silage and which includes means for cutting silage from the top of the silage stored in the silo, means for gathering and moving the cut silage toward the center of the silo, and means for discharging the cut silage laterally from the silo; the improvement comprising, in combination, a pair of parallel oppositely rotating elongated augers adapted to engage the upper surface of the silage in said silo and to cut and loosen silage therefrom and to gather said cut and loosened silage between said parallel augers and move said silage axially of said augers toward the center of the silo, a centrifugal blower spaced axially of said augers and positioned so that the axis of the impeller is parallel to the axes of the augers and spaced substantially midway therebetween, a housing for said blower defining a lateral opening for receiving silage therethrough from said augers, duct means adapted to receive silage from said blower for conveying and discharging the cut silage laterally from the silo, agitators operatively connected to said augers and movable therewith positioned between the inner terminal ends of the augers and the centrifugal blower for maintaining the entrance into the blower unblocked and for assisting in forcing cut silage into the blower housing, and movable agitating means operatively connected to said rotating augers and positioned to extend into said duct means and being operative for preventing blockage of said duct means by the silage passing therethrough.

References Cited in the file of this patent

UNITED STATES PATENTS

| | | |
|---|---|---|
| 772,911 | Acklin | Oct. 25, 1904 |
| 2,488,626 | Hansen | Nov. 22, 1949 |
| 2,532,318 | Mackey | Dec. 5, 1950 |
| 2,639,949 | Zollars | May 26, 1953 |
| 2,651,438 | Peterson | Sept. 8, 1953 |
| 2,671,696 | McLean | Mar. 9, 1954 |
| 2,677,474 | Long et al. | May 4, 1954 |
| 2,719,058 | Van Dusen | Sept. 27, 1955 |
| 2,739,846 | Jacobsen | Mar. 27, 1956 |